United States Patent [19]
Volper et al.

[11] Patent Number: 5,303,941
[45] Date of Patent: Apr. 19, 1994

[54] MOBILE TRIPOD SUPPORT DEVICE

[75] Inventors: Ralph A. Volper; Joseph Guarino, both of Brick, N.J.

[73] Assignee: Dream Jeans Productions, Inc., Brick, N.J.

[21] Appl. No.: 807,603

[22] Filed: Dec. 16, 1991

[51] Int. Cl.⁵ .............................................. B62B 3/10
[52] U.S. Cl. .................... 280/79.11; 248/129; 280/62; 280/47.11; 280/79.2; 403/315
[58] Field of Search .............. 280/79.11, 79.2, 47.34, 280/47.35, 79.5, 62, 2, 47.11; 248/129; 352/243; 354/293; 180/68.5; 408/315, 316

[56] References Cited

U.S. PATENT DOCUMENTS

| | | | |
|---|---|---|---|
| 1,189,053 | 6/1916 | Buchanan | 280/79.11 |
| 2,235,496 | 3/1941 | Greig | 180/69.21 |
| 3,437,164 | 4/1969 | Rabjohn | 180/68.5 |
| 4,542,909 | 9/1985 | Littwin et al. | 280/79.11 |

FOREIGN PATENT DOCUMENTS

| | | | |
|---|---|---|---|
| 3739183 | 4/1988 | Fed. Rep. of Germany | 280/47.34 |
| 1107848 | 1/1956 | France | 354/293 |
| 1344915 | 10/1963 | France | 403/316 |
| 675935 | 11/1990 | Switzerland | 180/68.5 |
| 1191348 | 11/1985 | U.S.S.R. | 280/62 |

Primary Examiner—Eric D. Culbreth
Attorney, Agent, or Firm—Abdallah & Muckelroy

[57] ABSTRACT

A mobile tripod support device for stable and secure engagement of a tripod for video cameras and auxiliary equipment. The device includes a triangular base component having ground-engaging wheels and tripod leg supports. A lidded storage compartment is disposed in part within the base component and provides for storage of auxiliary equipment and supplies. A storage battery is disposed in the storage compartment and is electrically connected to outlets affixed to a forward wall of the storage compartment.

The tripod support device can be easily maneuvered into close spaces and the self-contained electricity power source eliminates the inconvenience of extensions cords and a remote power source.

8 Claims, 3 Drawing Sheets

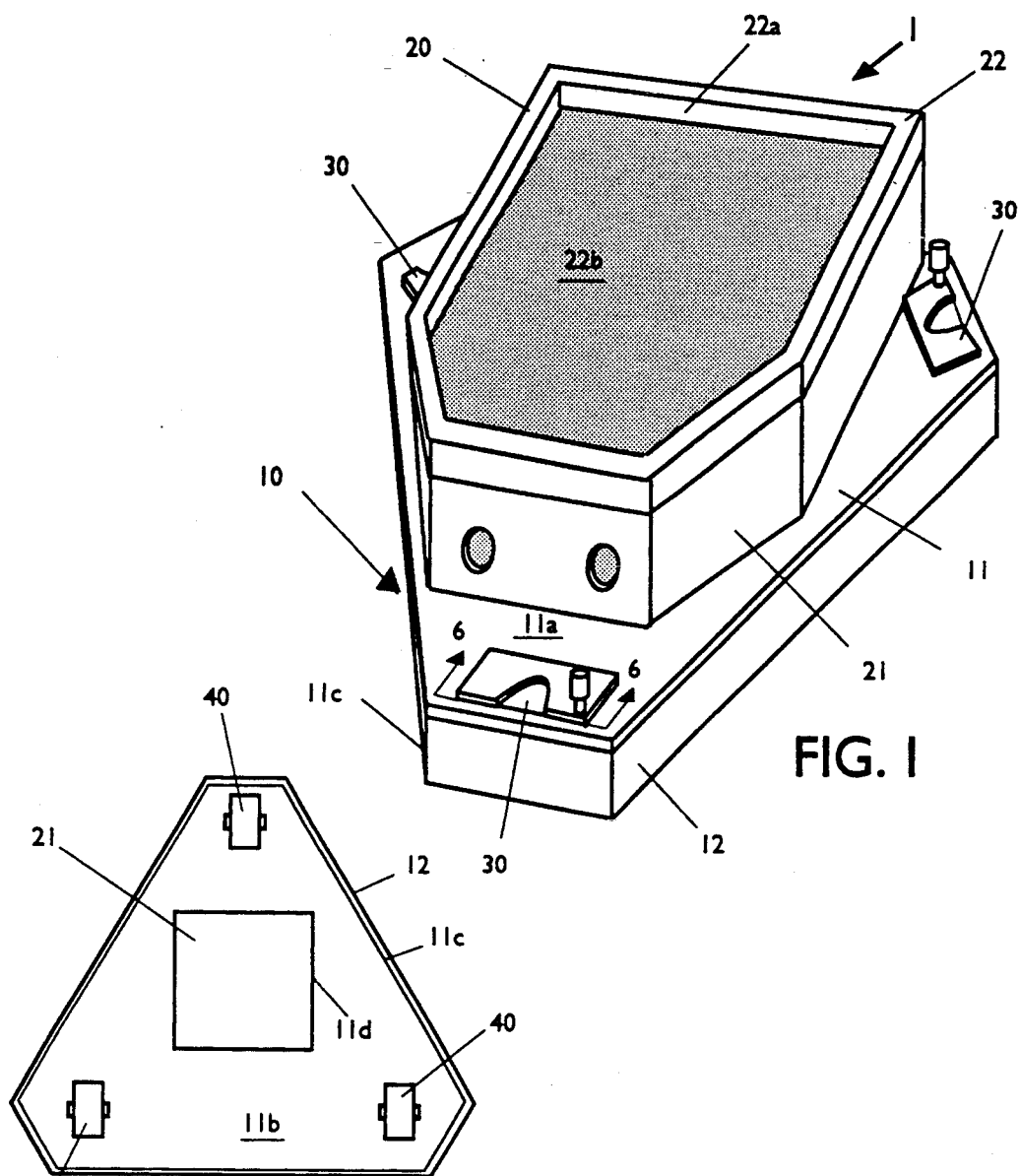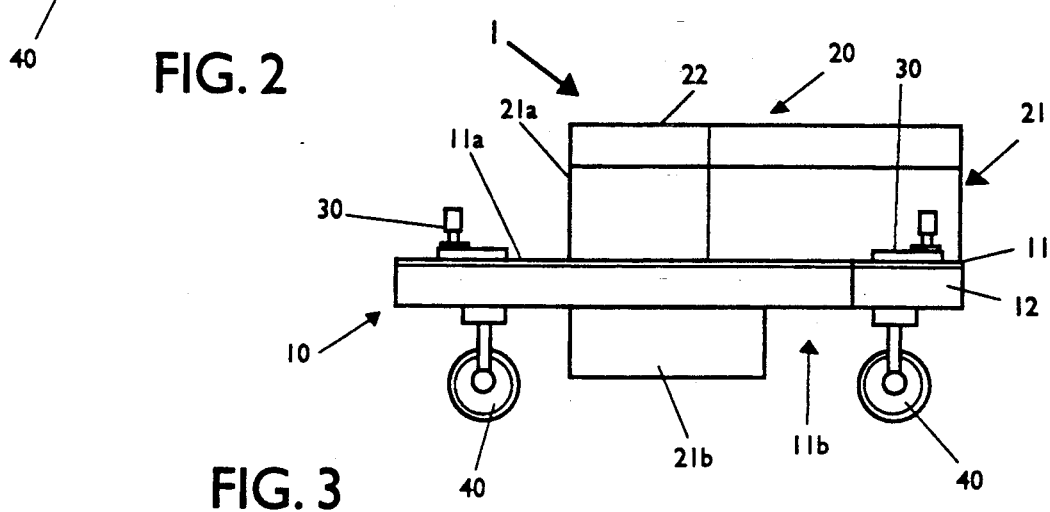

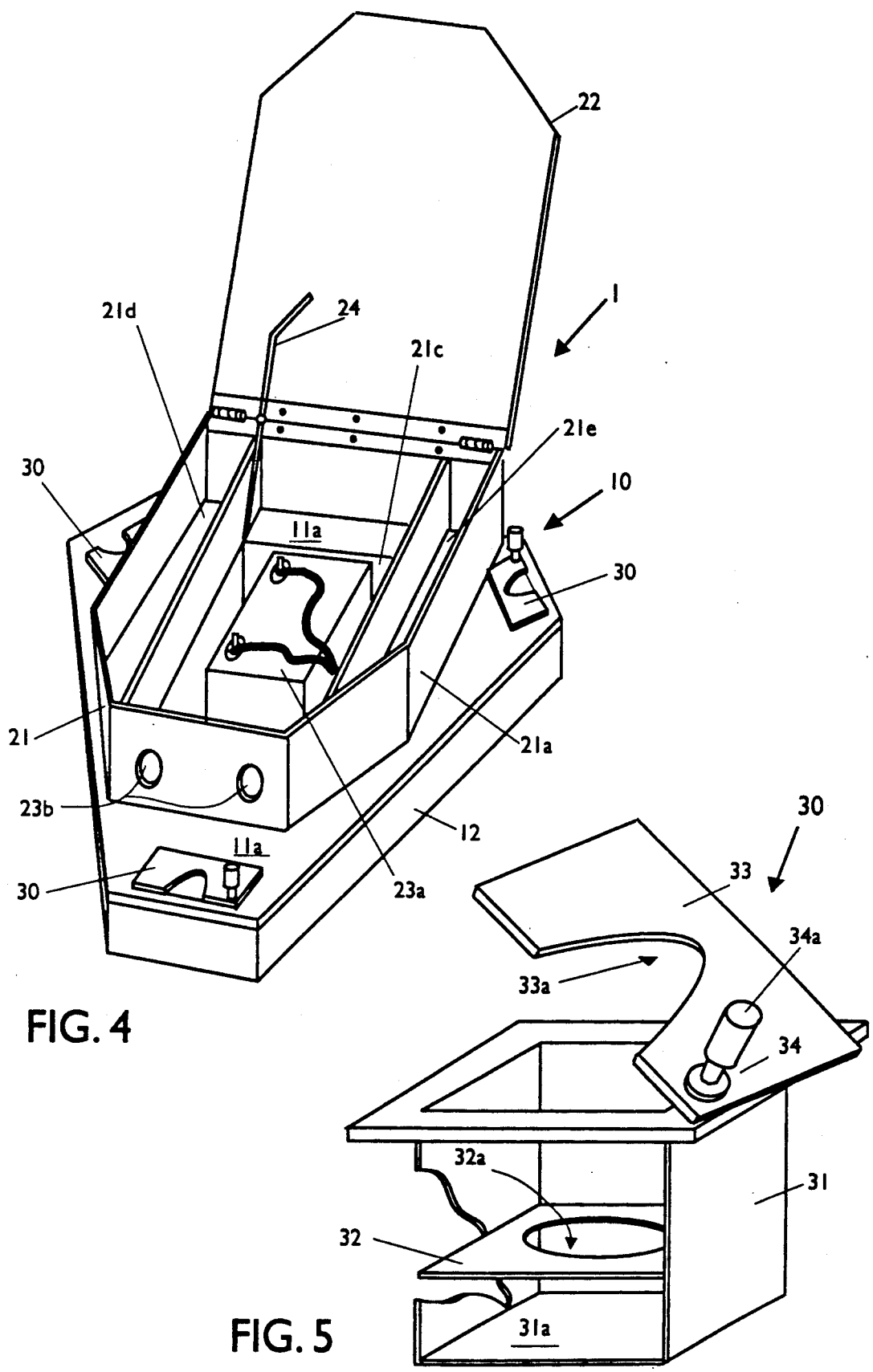

5,303,941

MOBILE TRIPOD SUPPORT DEVICE

BACKGROUND OF THE INVENTION

The present invention generally relates to tripod support devices. More specifically, this invention relates to mobile tripod support devices for video cameras and auxiliary camera equipment.

Tripods are widely used in the motion picture industry to support camera, lights and other related equipment. The complicated movements of camera operators in modern film-making requires that equipment tripods be mobile and easily maneuverable. Early mobile tripods are shown in U.S. Pat. No. 2,661,672 to Fairbanks and U.S. Pat. No. 2,719,043 to Oppenheimer. Various other types of mobile camera and equipment supports have also been disclosed in the prior art. For example, in U.S. Pat. No. 4,095,250 to Giglioli a steerable mobile camera carriage is shown that provides directional control of the carriage itself and cameras mounted thereon. U.S. Pat. No. 4,474,439 to Brown discloses a camera support including adjustable support means for auxiliary camera equipment such as a video monitor, an electronics package, and a battery or recorder. U.S. Pat. No. 4,657,267 to Jaumann et al. discloses a steerable mobile camera support transportable and operable by a single person. In U.S. Pat. No. 4,864,334 to Ellis a convertible video cart is disclosed that can alternately be used to transport video equipment and to support a camera for filming. While these various mobile camera and equipment supports provide certain advantages in the art, the tripod is still widely used due to its familiarity and flexibility for mobile or stationary use. Thus, mobile tripod support devices for tripods remain widely desireable in modern film-making. A mobile tripod support device is disclosed in U.S. Pat. No. 4,542,909 to Littwin et al. which includes a lower platform for receipt of auxiliary equipment, an upper platform for receipt of a tripod, a vertically adjustable seat disposed on the lower platform to the rear of the upper platform, and electrical components connectable to a remote electricity power source.

Several disadvantages of the prior art mobile tripods, camera supports and tripod support devices are known in the art. One prevalent disadvantage of many prior art devices is the requirement that equipment mounted on a tripod be connected to a remote electricity power source via extension cords. These cords must be dragged about as the tripod is positioned for various shooting orientations, thereby hindering operations. The prior art devices are also generally unsuitable for movement into close spaces. Stable and secure support of a tripod mounted on a mobile support device is also a desireable quality to facilitate quick movements of the camera. Also, means for safe storage of auxiliary equipment is generally absent from the prior art devices. These and other limitations in prior art mobile tripod support devices are overcome by the present invention.

SUMMARY OF THE INVENTION

The present invention discloses a mobile tripod support device generally comprising a triangular base component having tripod leg support means disposed on a top wall of the base component and ground-engaging swivel-mounted casters attached to a bottom wall of the base component, respectively at the vertices of the base component, and further including a storage compartment partially disposed within a central portion of the base component, the storage compartment having electricity power source means disposed therein to power a camera or auxiliary equipment affixed to a tripod mounted on the device.

A primary object of this invention is to provide a mobile support for a tripod that can be easily maneuvered into close spaces.

Another object of the present invention is to provide a mobile support for a tripod having a self-contained power source to meet short-term electrical power needs for cameras and auxiliary equipment.

Another object of this invention is to eliminate the need for a remote electricity power source and the related dragging about of power lines and extension cords.

It is also an object of the present invention to provide a mobile support for a tripod that can be easily stored for transport.

A further object of this invention is to provide a mobile support for a tripod having means for stable and secure engagement of a tripod.

A still further object of the present invention is to provide a mobile tripod support device having enclosed storage means for auxiliary equipment and supplies to protect such equipment and supplies from damage during filming operations.

It is also an object of this invention to provide a mobile tripod support device having enclosed storage means that can be readily accessed during filming operations.

These and other objects and advantages of the present invention will be apparent to those skilled in the art from the following description of a preferred embodiment, claims and appended drawings.

BRIEF DESCRIPTION OF THE DRAWINGS

FIG. 1 is a top perspective of the mobile tripod support device of the present invention shown with the storage compartment lid in a closed position.

FIG. 2 is a bottom plan view of the tripod support device.

FIG. 3 is a side elevational view of the tripod support device.

FIG. 4 is a top perspective view of the tripod support device shown with the storage compartment lid in an open position.

FIG. 5 is a partially fragmented top perspective view of tripod leg support means.

DESCRIPTION OF A PREFERRED EMBODIMENT

Figure 6:
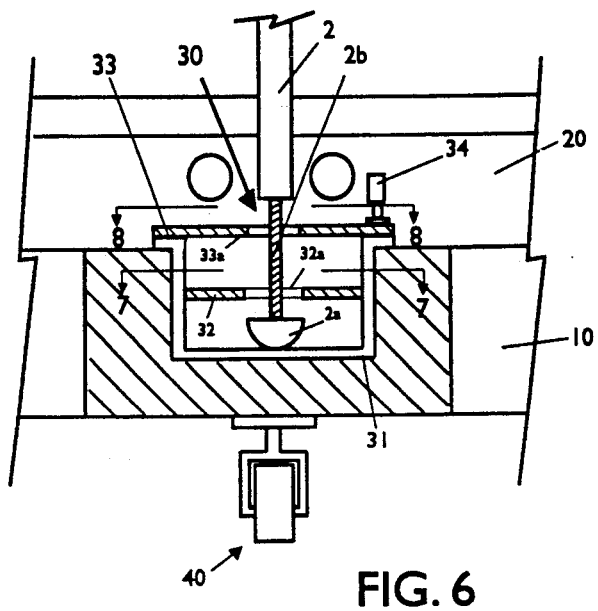
FIG. 6 is a cross-sectional view taken along line 6—6 of FIG. 1.

FIG. 1 illustrates in a top perspective view the mobile tripod support device 1 of the present invention. Support device 1 generally comprises a base component 10, a storage compartment 20, tripod leg support means 30 and ground-engaging wheel means 40. In FIG. 1 storage compartment 20 is shown in its closed position. Base component 10 includes a substantially triangular base member 11 having a top wall 11a, a bottom wall 11b (FIG. 2) and a peripheral side wall 11c extending between the top wall 11a and the bottom wall 11b. A rubber bumper 12 is attached to the outer face of side wall 11c. Tripod leg support means 30, hereinafter described in greater detail, are disposed in the top wall 11a of base member 11 at the respective vertices thereof, and ground-engaging wheel means 40 are attached to the bottom wall 11b of base member 11 likewise at the respective vertices of base member 11 (FIG. 2). Wheel means 40, preferably swivel-mounted casters, are attached to base member 11 in a manner permitting 360° lateral rotation of said wheel means 14.

Base member 11 further includes an opening 11d (FIG. 2) formed in a central portion thereof. Storage compartment 20 is disposed in part in the opening 11d of base member 11. Storage compartment 20 is a selectively closeable box member having a bottom tray member 21 and a storage compartment lid 22 hingedly attached at one side to tray member 21. Storage compartment lid 22 includes a recessed cavity 22a formed in the outside top surface thereof. The floor of storage compartment lid cavity 22a is preferably covered by a slip-resistant material 22b such as carpet or the like. As can be seen in FIG. 3, a first portion 21a of tray member 21 is disposed above the top wall 11a of the base member 11 of base component 10 and a second portion 21b of tray member 21 integrally formed with first portion 21a extends through base member opening 11d to below the bottom wall 11b of base member 11. Storage compartment lid 22 is attached to the top of first portion 21a of tray member 21. The second portion 21b of tray member 21 receives a storage battery, a component of electricity power source means, as hereinafter described.

Referring now to FIG. 4 wherein there is shown a top perspective view of tripod support device 1 with storage compartment lid 22 disposed in an open position, it can be seen that tray member 21 includes a recessed central tray member cavity 21c extending from the top of the first portion 21a of tray member 21 to the bottom of the second portion 21b. Respective recessed side tray member cavities 21d, 21e are disposed to each side of central tray member cavity 21c in the first portion 21a of tray member 21, the top wall 11a of base member 11 forming the floors of the respective side tray member cavities 21d, 21e. Electricity power source means 23, comprising a storage battery 23a electrically connected to electrical outlets 23b, is disposed in tray member 21. Storage battery 23a is disposed in the central tray member cavity 21c and electrical outlets 23b are disposed in a forward face of the first portion 21a of tray member 21. Electrical outlets 23b are preferably cigarette lighter type sockets as known in the art. Storage compartment lid 22 is preferably lockable in an open position by means of collapsible hinge 24 attached at one end to lid 22 and at the opposite end to tray member 21. The mobile tripod support device 1 of the present invention can be easily maneuvered omni-directionally as a result of the swivel-mounted casters 14. The low height of the device 1 when storage compartment lid 22 is closed and the triangular shape of base member 11 permits the device 1 to be moved into the close spaces that may be encountered during a video shoot. Storage battery 23a also serves as a counterbalancing weight to prevent a tripod mounted on the device 1 from tipping over the forward end of the base member 11 and facilitates stability during shooting operations. Tripod leg support means 30 also provides dual support of a tripod as hereinafter described.

Figure 7:
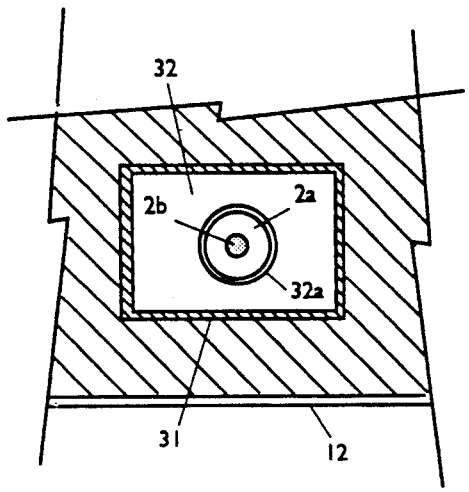
FIG. 7 is a cross-sectional view taken along line 7—7 of FIG. 6.
Figure 8:
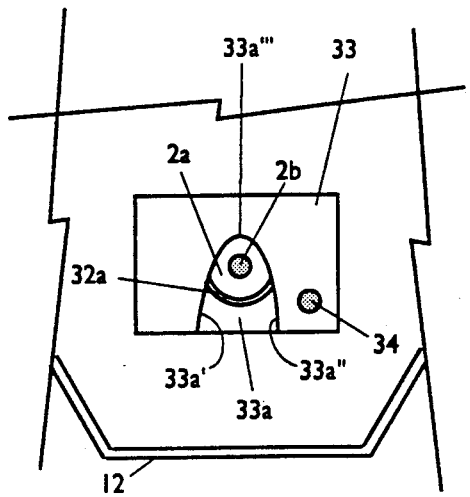
FIG. 8 is a cross-sectional view taken along line 7—7 of FIG. 6.

FIG. 5 illustrates in a partially fragmented top perspective view a typical tripod leg support means 30, shown removed from base member 11. The three identical tripod leg support means 30 are received in a support means cavity formed in base member 11 and are respectively oriented in base member 11 to appropriately receive respective legs of a tripod. Tripod leg support means 30 generally comprises a support means body 31, a first plate 32 fixedly attached to and extending laterally across the support means body 31 above the bottom floor 31a of body 31, and a second plate 33 rotatably attached by means of a threaded pin 34 having a knurled pin head 34a to a top portion of support means body 31a for lateral rotation of second plate 33 relative to body 31. First plate 32 provides means to secure the foot 2a of a tripod leg 2 and second plate 33 provides means to selectively lock the threaded stem 2b, or ankle, of the foot 2a of a tripod 2 (FIG. 6). As can be seen in FIG. 7 first plate 32 includes a foot orifice 32a formed in a central portion of first plate 32 for receipt of the tripod foot 2a. In FIG. 8 it can be seen that second plate 33 includes a lateral slot 33a formed therein having a decreasing width from a side of second plate 33 to a central portion of second plate 33. Lateral slot 33a is preferably formed having an angled side wall 33a' and a straight side wall 33a". respectively co-extensive with an accurate slot rear wall 33a'''.

Tripod leg support means 30 provides stable and secure engagement of a tripod leg 2 to prevent lateral displacement and tipping of a tripod disposed in the device 1. As can be best seen in FIG. 6 when tripod leg 2 is fitted into the tripod leg support means 30 the foot 2a of tripod leg 2 extends through first orifice 32a and below first plate 32 and rests on the floor 31a of support means body 31. Thus, unless tripod leg 2 is raised vertically upward from the tripod leg support means 30, tripod leg will be retained therein. Therefore, if, for example, tripod leg 2 is accidentally struck from the side, second plate 32 will prevent rotation of foot 2a from support means 30. For additional secured support, second plate 33 is rotated to engage the threaded leg 2. Tripods known in the art are generally formed having a threaded extension or ankle 2b extending from tripod foot 2a which engages the tripod leg 2. Second plate 33 is rotated with pin 34 loosened and engages the threaded ankle 2b of tripod foot 2a in the lateral slot 33a thereof. Pin 34 is then tightened to secure second plate 33 in place.

Operation of the mobile tripod support device 1 of the present invention should be readily understood from the foregoing description of its structure. As a mobile support for a tripod, tripod legs 2 are respectively received in the tripod leg support means 30. The foot 2a of a tripod leg 2 is passed through the foot orifice 32a of first plate 32 and brought to rest in bearing engagement with the floor 31a of support means body 31. Foot orifice 32a may be disposed adjacent to a portion of the side of foot 2a above its lateral mid-line when foot 2a is disposed in its resting position whereby foot orifice 32a prevents lateral movement of foot 2a by lateral bearing engagement of foot 2a with foot orifice 32a, or foot 2a may be disposed below foot orifice 32a whereby foot 2a can only be removed from leg support means 30 by vertical movement of foot 2a through foot orifice 32a. Thus, in such a configuration if foot 2a is moved laterally in tripod leg support means 30, for example by bumping of tripod leg 2 against a chair, table, etc., then foot 2a will be moved out of vertical alignment with foot orifice 32 and thereby prevented from moving from support means 30 by the bearing engagement of first plate 32 with a top portion of foot 2a. Additional support for a tripod leg 2 is provided by loosening pins 34 and rotating second plate 33 to engage the ankle 2b of foot 2a in the lateral slot 33a of second plate 33. Pin 34 is then tightened to secure second plate 33 in its engaging position. The engaging of second plate 33 with the ankle 2b, or threaded stem, of foot 2a in combination with the stable support provided by first plate 32 gives additional advantages over the prior art devices which engage the tripod leg 2 itself or only have single tripod leg support means. In the tripod leg support means 30 of the present device 1 second plate 33 can be temporarily removed from one or more tripod leg ankles 2b for adjustments of a tripod, and tripod leg 21 remains retained in stable support by operation of first plate 32. Thus, tripod is always being supported from tipping over or falling from the device 1, even during adjustments, etc.

The closeable storage means of device 1 also provide advantages over the prior art. Auxiliary equipment and camera supplies can be safely stored in the central tray member 21c and the respective side tray member cavities 21d, 21e. The selective closure of storage compartment lid 22 over the cavities 21c, 21d, 21e protects stored items from being inadvertently damaged by falling from storage compartment 20 or having something dropped on the stored items.

Various changes, additions and modifications may be made to the preferred embodiment without departing from the spirit and scope of the present invention. Such changes, additions and modifications within a fair reading of the following claims are intended as part of this disclosure.

Therefore, in view of the foregoing we claim:

1. A mobile tripod support device comprising
a base component having tripod leg support means and ground-engaging wheel means, said base component including a substantially triangular base member having a top wall, a bottom wall, a peripheral side wall extending between said top wall and said bottom wall, an opening being formed in a central portion of said base member, said tripod leg support means being disposed in part in said top wall and said ground-engaging wheel means being attached to said bottom wall, said storage compartment being partially disposed in the opening of said base member; and
a storage compartment partially disposed within the base component, said storage compartment including electricity power source means, said storage compartment comprising a recessed bottom tray member and a storage compartment lid hingedly attached at one side to said bottom tray member by lid hinge means, said bottom tray member being partially disposed below the top wall of said base component thereby exposing a portion of a side wall of the tray member above the top wall of the base component, said storage compartment lid being formed having an inside bottom surface and an outside top surface, said outside top surface having a recessed cavity formed therein.

2. A mobile tripod support device, as in claim 1 further including a slip-resistant surface disposed on said recessed cavity.

3. A mobile tripod support device as in claim 1 further including lid locking means comprising a collapsible hinge selectively lockable in an open position and attached at one end to said lid and at an opposite end to said storage compartment.

4. A mobile tripod support device comprising
a base component having tripod leg support means and ground-engaging wheel means, said tripod leg support means comprising a support means body having a tripod foot locking means and tripod foot threaded extension locking means, said tripod foot locking means comprising a first plate extending laterally across a leg cavity above the bottom surface of said leg cavity, said first plate having a foot orifice formed in a central portion of the first plate, a foot of a tripod being receivable through said foot orifice of said first plate; and
a storage compartment partially disposed within the base component, said storage compartment including electricity power source means.

5. A mobile tripod support device as in claim 4 wherein said tripod ankle locking means comprises a second plate rotatably attached to said support means body in a manner for lateral rotation of said second plate across said body, said second plate being selectively lockable and having a lateral slot of decreasing width extending from a side of said second plate to a central portion of said second plate, a foot stem of a tripod being receivable in the lateral slot of said second plate.

6. A mobile tripod support device as in claim 5 wherein said second plate is attached to said base component by a threaded pin having a knurled pin head.

7. A mobile tripod device comprising a base component comprising a substantially triangular base member having a top wall, a bottom wall, and a peripheral side wall extending between said top wall and said bottom wall, a rubber bumper being attached to the peripheral side wall, said base member having an opening formed in a central portion thereof, a plurality of tripod leg support means being disposed in the top wall of said base member at respective vertices of said base member, a plurality of ground-engaging swivel mounted casters being attached to the bottom wall of said base member at respective vertices of said base member; and,
a storage compartment comprising a opened-to recessed tray member having a lid member hingedly attached at one side to said tray member, said tray member being disposed in the opening of said base component having a portion of said tray member disposed below the top wall of said base component and a portion of a side wall of said tray member disposed above the top wall of said base component, said lid member having a recessed cavity formed in an outside surface thereof, a storage battery being disposed in said tray member and at lease one electrical outlet being disposed in the side wall of said tray member disposed above the top wall of said base component, said storage battery and said electrical outlet being electrically connected.

8. A mobile tripod support device as in claim 7 wherein said tripod leg support means comprises a support means body having tripod foot locking means and tripod foot threaded extension locking means,
said tripod foot locking means comprising a first plate extending laterally across said support means body above a bottom surface of said body, said first plate having a foot orifice formed in a central portion thereof, a foot of a tripod being receivable through said foot orifice of said first plate, said tripod ankle locking means comprising a second plate rotatably attached to said support means body above said first plate by a threaded pin having a knurled pin head in a manner for lateral rotation of said second plate across said body, said second plate having a lateral slot of decreasing width from a side of said second plate to a central portion of said second plate, a foot stem of a tripod being receivable in the lateral slot of said second plate.

* * * * *